US005668904A

United States Patent [19]
Sutherland et al.

[11] Patent Number: 5,668,904
[45] Date of Patent: Sep. 16, 1997

[54] FIBER OPTIC CABLE CONNECTOR APPARATUS AND METHOD

[75] Inventors: Martin A. Sutherland, Tacoma; Donald L. Barney, Kent, both of Wash.

[73] Assignee: Northwest Fiberoptic Technologies Inc., Fife, Wash.

[21] Appl. No.: 686,345

[22] Filed: Jul. 25, 1996

[51] Int. Cl.⁶ .................................................. G02B 6/38
[52] U.S. Cl. ................................ 385/72; 385/78; 385/81
[58] Field of Search ................................ 385/72, 73, 76, 385/77, 78, 81, 136, 137, 138, 139

[56] References Cited

U.S. PATENT DOCUMENTS

| | | | |
|---|---|---|---|
| 4,168,107 | 9/1979 | Sauter | 350/96.13 |
| 4,168,108 | 9/1979 | Judeinstein | 350/96.22 |
| 4,168,109 | 9/1979 | Dumire | 350/96.22 |
| 4,730,890 | 3/1988 | Kashimura et al. | 350/96.2 |
| 4,730,892 | 3/1988 | Anderson et al. | 350/96.21 |
| 4,807,957 | 2/1989 | de Jong et al. | 350/96.21 |
| 4,807,958 | 2/1989 | Gunner et al. | 350/96.21 |
| 5,337,390 | 8/1994 | Henson et al. | 385/81 |
| 5,452,391 | 9/1995 | Chou et al. | 385/78 X |
| 5,570,445 | 10/1996 | Chou et al. | 385/78 X |

Primary Examiner—Phan T. H. Palmer
Attorney, Agent, or Firm—William G. Forster

[57] ABSTRACT

A reusable fiber optic connector for splicing, coupling, and connecting fiber optic cables without the use of adhesives or epoxies. The connector includes a retaining collet having a centrally disposed bore sized to receive the outer protective jacket of a fiber optic cable therethrough. The retaining collet being arranged to threadedly engage the compression bore of a connector frame, wherein as the retaining collet is threadedly advanced into the compression bore of the connector frame, the retaining collet is compressed against the outer protective jacket of a fiber optic cable. A retaining collet so compressed secures the fiber optic cable in proper position relative to the connector frame. In order to urge the fiber optic connector, including connector frame with fiber optic cable secured by the retaining collet, toward a coupling device such as a patch pad or coupling block, biasing means comprising a spring coaxially disposed about the connector frame and a cap are provided. One end of the spring engaging the connector frame, and an opposite enlarged second end engaging the cap wherein the spring is compressed by relative movement between the cap and the connector frame when the connector is received by the coupling device.

20 Claims, 3 Drawing Sheets

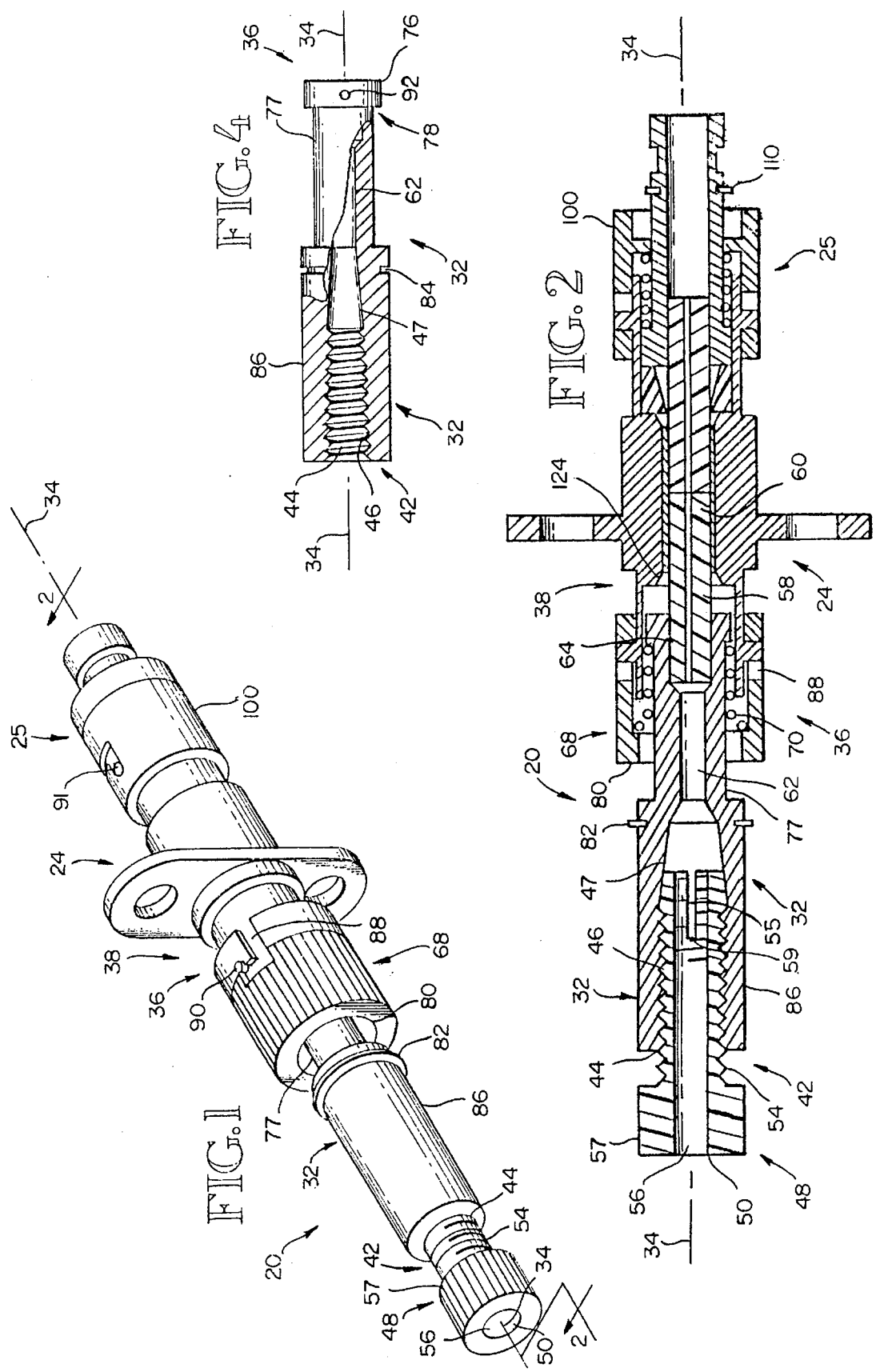

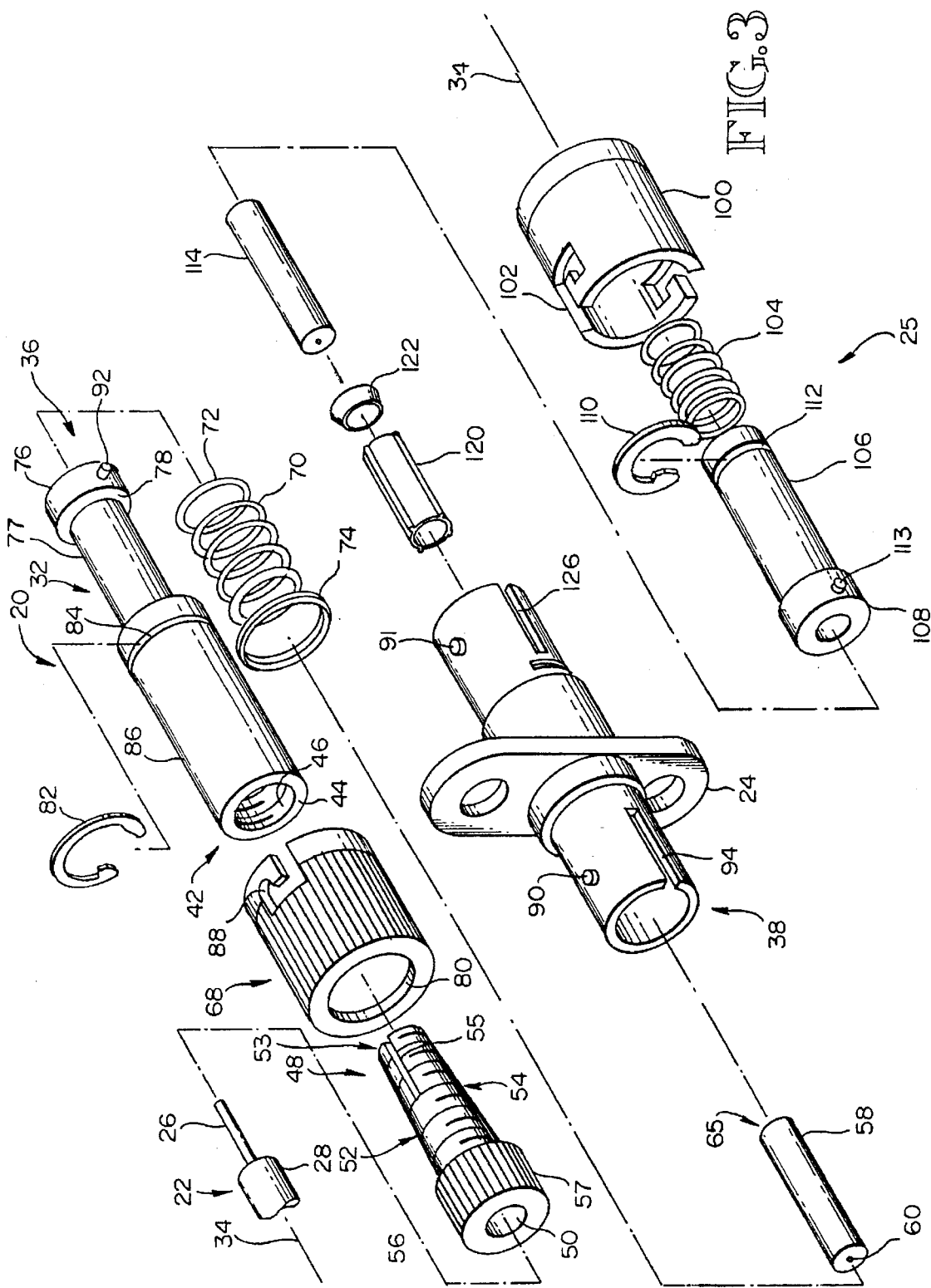

FIBER OPTIC CABLE CONNECTOR APPARATUS AND METHOD

BACKGROUND

This invention relates generally to fiber optic cable, and more particularly to a method and apparatus for connecting and splicing fiber optic cables.

A number of devices have been invented for connecting and splicing fiber optic cables. Many of the designs invented for this purpose incorporate a procedure or step that permanently changes or transforms a material used to attach the fiber optic cable to the connector in its final secured position. For various reasons, including a defective attachment, it is often desired to thereafter separate the connector from the fiber optic cable so that the connector can be reused. However, when a permanent change or transformation of material used in the attachment takes place, it is often difficult to undo the connection and separate the fiber optic cable from the connector.

For example in 1979 U.S. Pat. No. 4,168,108 issued to Judeinstein disclosing a fiber optic device for connecting a fiber optic cable to a cylindrical mixer. In securing the fiber optic bundle to the connecting device, the bundle is held in place by cementing the same to a sleeve. Because the cementing step is somewhat permanent, reuse of the connector would likely be difficult. Also in 1979, U.S. Pat. No. 4,168,109 issued to Dumire showing a fiber optic connector apparatus that employs heat to cause the protective sheathing on an optic cable to flow. Once the heated material cools, the cable is maintained in an adhered condition. In this situation, the sheathing is permanently transformed at the point of attachment to make the bond.

Similarly, U.S. Pat. No. 4,730,890 issued to Kashimura in 1988 disclosing a plug set for an optical connector used with optical fiber cables. The plug set fixes and secures the cable by fixing reinforcing fibers of the optical fiber cable to a bushing with the use of thermo-shrinkable tube. Although no bonding agent such as cement or epoxy is used in this device, a thermo-shrinkable tube is permanently transformed to apply pressure on the reinforcing fibers of the fiber optic cable. Accordingly, like Dumire and Judeinstein, the Kashimura device would likely be difficult to reuse.

Some later designs, however, are directed to connectors for fiber optic cables that splice and connect the same without incorporating materials that are transformed, and without having a step in the connection process that precludes the reuse of the connector. For example in 1988 U.S. Pat. No. 4,730,892 issued to Anderson et al disclosing an optical fiber mechanical splice that employs an elastomer member that deforms to secure and align abutting optical fibers. Although a connector having this construction is reusable, and the attachment is easily reversed, the connector is not adapted for use with certain standard coupling devices and connectors presently used within the fiber optic cable industry. Similarly, in 1989 U.S. Pat. No. 4,807,957 issued to de Jong et al disclosing a connector for optical fibers that operates to couple and splice fiber optic cables independent of adhesives. In this design, spherical balls are employed to align the abutting chamfered sleeves. Like Anderson however, the device employs nonstandard construction that is not adapted for use with standard coupling devices used within the fiber optic cable industry.

Additionally, U.S. Pat. No. 4,807,958 issued to Gunner et al in 1989 disclosing a method of interconnecting optical fiber cables with the use of spherical lenses disposed at the ends of the optical fibers. Like some of the earlier designs, Gunner employs a thermo-shrinkable material in the connection process. Here, a thermo-shrinkable material is employed to form a sleeve for securing together the polyurethane sheath of the cable to a metallic collar and cylindrical body of the connector.

While all the above connection devices perform the task of connecting and splicing fiber optic cables, for reasons noted above, their performance is somewhat limited by their particular construction. Indeed, the noted connectors either employ some sort of irreversible process, including heat shrinkable materials and epoxy cements, or they are not adapted for use with certain standard coupling devices.

According, a need remains for a reusable fiber optic connector for use with common, industry accepted, coupling and splicing devices that enable an installer to perform the splicing and coupling task independent of adhesives or materials that are heat transformed.

SUMMARY

One object of the present invention is to eliminate the use of epoxies and adhesives in the connection process of fiber optic cable connectors.

A second object of the present invention to enable the repeated use of a single fiber optic connector.

Another object is to enable an installer of fiber optic cables to remove or disconnect a previously installed connector from a fiber optic cable without damaging the connector.

Yet another object is to reduce the expense of fiber optic cable field connections.

A further object is to eliminate the use of epoxies and adhesives in the connection process of fiber optic cable connectors while allowing the user to connect and splice the same to standard fiber optic connection devices used in the fiber optic cable industry including coupling blocks and patch pads.

Still another object is to increase the efficiency and speed of a fiber optic cable installer.

The invention is an improved reusable fiber optic connector provided for use with common, industry accepted, coupling devices of the type having a portion thereof adapted to receive the fiber optic connector. The connector is arranged for connecting and splicing fiber optic cables of the type that include a protective outer jacket, that protects a coaxially disposed optical fiber core.

The connector comprises a connector frame disposed about a longitudinal frame axis. The connector frame includes an inserted end adapted for insertion into the receiving portion of a common coupling device, and an opposing compression end spaced along the frame axis at the opposite extremity thereof. The compression end defines a compression bore disposed coaxially about the frame axis. A portion of the compression bore comprises a radially disposed threaded inner surface, which as noted below, threadedly receives and compresses a retaining collet.

Disposed on the inserted end is a common ceramic tip for positioning the optical fiber core coaxially along the frame axis into the coupling device. The optical fiber core is guided to the ceramic tip, from the compression bore, through a passage, that extends from the compression bore to the ceramic tip.

In order to maintain the connector coupled to the coupling device, means for biasing the connector frame toward the coupling device is provided. Included therein is a spring located between the connector frame and a cap. The spring is disposed such that the cap is movable to a locked position adjacent the coupling device. When the cap is so moved the spring urges the inserted end of the connector frame toward the coupling device.

To secure the fiber optic cable in position relative to the connector frame, in coaxial alignment with the frame axis, a compressible retaining collet is provided. The retaining collet includes a radially disposed inner gripping surface, and a radially disposed outer compression surface The inner gripping surface is formed to define a coaxial gripping bore sized to receive the outer jacket of the fiber optic cable in close fitting relationship.

To maintain and secure the fiber optic cable within the retaining collet, the retaining collet is compressible between a first uncompressed condition where the retaining collet is threadedly disengaged from the connector frame for receiving a fiber optic cable through the gripping bore, to a second compressed condition where the outer compression surface of said retaining collet threadedly engages the threaded inner surface of the compression bore of the connector frame. Accordingly, as the retaining collet is advanced to the second compressed condition, portions of the inner gripping surface are urged against the outer jacket of the fiber optic cable to secure and grip the same.

A further aspect of the invention, therefore, is to provide a retaining collet having threads disposed on a portion of the outer compression surface, and a plurality of grooves radially disposed on the inner gripping surface for gripping the outer jacket of a fiber optic cable. Moreover, the threaded portion of the outer compression surface of the retaining collet is tapered. The threaded portion thereof sloping radially inward toward the frame axis from a first diameter to a decreasingly smaller diameter in the direction along the frame axis toward the inserted end. Accordingly, as the retaining collet threadedly engages the threaded inner surface of the compression bore, the retaining collet advances therein to the second compressed condition where the outer compression surface is wedged within the compression bore. To increase the compressibility of the retaining collet, a portion thereof can be removed to define a slot oriented parallel to the frame axis.

In another aspect of the invention a process or method of connecting and splicing fiber optic cables is disclosed. Typically, the components of a connector as described above are provided. A fiber optic cable is positioned through the compressible retaining collet for securing the fiber optic cable in position relative to the connector frame in coaxial alignment with the frame axis. The outer jacket of the fiber optic cable is secured within the retaining collet in close fitting relationship to the inner gripping surface thereof. With the fiber optic cable extending through the retaining collet, the exposed optical fiber core is guided along the frame axis from the compression end of the connector frame, through a passage disposed adjacent the compression bore, into the ceramic tip attached on the connector frame at the inserted end for positioning the optical fiber core along the frame axis into the coupling device.

The retaining collet is then threadedly engaged with the connector frame to compress the retaining collet, wherein the same is compressed by moving it from a first threadedly disengaged uncompressed position for receiving a fiber optic cable therein, to a second compressed position where the outer compression surface threadedly engages the compression bore of the connector frame. Finally, the connector frame is biased toward the coupling device so that the inserted end of the connector frame is urged into the receiving portion of the coupling device.

The foregoing and other objects, features, and advantages of this invention will become more readily apparent from the following detailed description of a preferred embodiment which proceeds with reference to the accompanying drawings, wherein the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1 is a perspective view of a preferred embodiment of a fiber optic cable connector (lower left) that is connected to a typical coupling block with a prior art connector (upper right) plugged into the opposite side of the coupling block.

FIG. 2 is a cross-sectional view of a preferred embodiment of a fiber optic cable connector (left side) that is connected to a typical coupling block with a prior art connector plugged into the opposite side (right side) of the coupling block, the section view taken along 2—2.

FIG. 3 is an exploded view of a preferred embodiment of a fiber optic cable connector (upper left) that is connected to a coupling block (middle) with a prior art connector (lower right) plugged into the opposite side of the coupling block.

FIG. 4 is a partial sectional view of an alternate embodiment of a connector frame wherein the compression bore is tapered.

DETAILED DESCRIPTION OF PREFERRED EMBODIMENT

Figure 5:
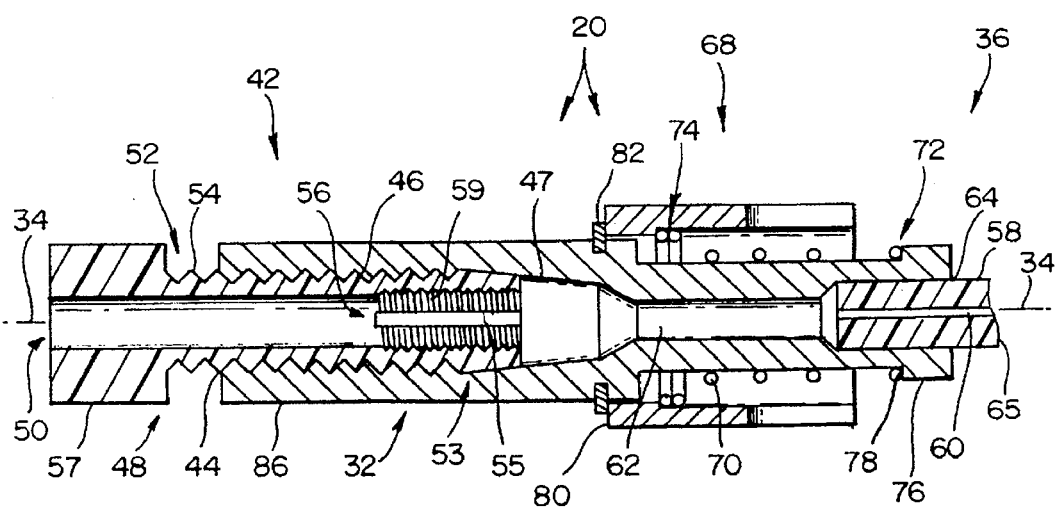
FIG. 5 is a cross-sectional view of a fiber optic cable connector in accordance with the present invention.

FIGS. 1 through 5 show a fiber optic cable connector constructed in accordance with the present invention. The fiber optic cable connector, hereinafter referred to as "connector 20", is provided for the connection of a fiber optic cable 22 to a coupling device of the type including patch pads (not illustrated) and coupling blocks 24, which are well known in the art. The connector 20 is designed for use with a fiber optic cable 22 that comprises an optical fiber core 26 coaxially disposed inside a protective outer jacket 28. It should be noted that illustrations 1 through 3 show the preferred embodiment connector 20 oriented substantially to the left of a coupling block 24 wherein a prior art connector 25 is received by coupling block 24 from the opposite side, i.e., right side.

Turning now to FIG. 3, generally, a connector 20 provided in accordance with the present invention includes an elongate cylindrical shaped connector frame 32 longitudinally disposed about a frame axis 34. As will be discussed more fully below, the frame axis 34 is the axis about which the optical fiber core 26 is secured by the connector 20. The connector frame 32 includes a inserted end 36 adapted for insertion into the receiving portion 38 of the coupling device which is illustrated in FIG. 3 as coupling block 24.

At the opposing extremity of the connector frame 32, spaced along the frame axis 34, a compression end 42 is provided. As will be seen below, the compression end 42 is configured to compress, i.e., apply pressure that is substantially directed inward in a uniformly distributed radial direction to a retaining collet 48 that is wedged into a compression bore 44 that originates at the compression end 42 of the connector frame 32.

This, in turn, transmits the pressure to the outer jacket 28 of the fiber optic cable 22 that is coaxially disposed through the retaining collet 48. In this way, the retaining collet 48 grips the fiber optic cable, securely maintaining the same in proper position relative to the connector frame 32. Accordingly, the compression end 42 is formed to define a compression bore 44 that is coaxially disposed about the frame axis 34, extending toward the inserted end 36. Further, a portion of the compression bore 44 is threaded to define a threaded inner surface 46 for threadedly engaging a retaining collet 48.

A retaining collet 48 is provided as a threadedly coupled component of the connector 20 which transfers substantially radially directed pressure to the outer jacket 28 of the fiber optic cable 22 to grip and maintain the fiber optic cable 22 in coaxial alignment with the frame axis 34. The retaining collet 48 is an elongate member that is substantially tubular in shape, through which the fiber optic cable 22 is received. To so receive the fiber optic cable 22, a coaxial gripping bore 50 is provided therethrough. The gripping bore 50 extends entirely through the retaining collet 48. In the preferred embodiment, the retaining collet 48 is constructed of plastic, however other materials, including metal, would be equally suitable.

The retaining collet 48 is adapted to be threadably received into the compression bore 44 of the connector frame 32. In the preferred embodiment, the retaining collet 48 is formed with a tapered outer surface so that it is wedged into the compression bore 44 as it is threadedly advanced therein. Thus, as the retaining collet 48 is threadedly advanced into the compression bore 44, pressure is generated on the retaining collet 48, radially directed inward toward the frame axis 34, against a fiber optic cable 22 disposed therethrough.

The retaining collet 48 comprises a coaxially disposed gripping bore 50 that defines an inner gripping surface 56. The gripping bore 50 is of sufficient size to receive the fiber optic cable 22 in close fitting relationship, i.e., the outer jacket 28 of the fiber optic cable 22 contacts the inner gripping surface 56. With this configuration, when pressure is applied, i.e., transmitted radially by the outer compression surface 54 of the retaining collet 48, the outer jacket 28 of the fiber optic cable 22 engages the inner gripping surface 56 of the gripping bore 50, and is maintained securely in position relative to the connector frame 32. In this way, the fiber optic cable 22 can resist tension forces that tend to pull the same away and out from the connector 20

The radially applied pressure is imparted to the outer compression surface 54 via threaded engagement between the connector frame 32 and the retaining collet 48. More specifically, the retaining collet 48 is compressible from a first disengaged uncompressed position for receiving a fiber optic cable 22 therein, i.e., through the gripping bore 50, to a second compressed position where the outer compression surface 54 thereof threadedly engages the threaded inner surface 46 of the compression bore 44 of connector frame 32. Thus relative threaded engagement between the connector frame 32 and the retaining collet 48 produce the required radially directed compressive force. Additionally, a tapered unthreaded portion 47 of the compression bore 44 is provided as a transition between the threaded inner surface 46 and the adjacent portion of the connector frame 32.

The relative difference in size and/or shape of the outer compression surface 54 of retaining collet 48 and the threaded inner surface 46 of the compression bore 44 is the source or cause of the compression imparted to the retaining collet 48. As noted above, the retaining collet is wedged into the compression bore 44, as it threadedly advances therein. This creates a radially inward directed pressure upon the outer compression surface 54.

For example, as the retaining collet 48 threadedly engages the connector frame 32 and is advanced into the compression bore 44, the fit therebetween becomes restricted which causes a wedging action of the retaining collet 48 being forced into the circumferentially smaller compression bore 44. Thus the restricted fit is brought about by the specific construction of either the connector frame 32, the retaining collet 48, or a combination thereof. More specifically, the wedging forces arise from a difference in circumferential size between the contacting surfaces of retaining collet 48 against the connector frame 32, which is created by a tapering of either one of the contacting surfaces, or a combination thereof. Additionally, a difference in circumferential size between the retaining collet 48 and the compression bore 44, without any tapering of contacting surfaces will also produce wedging forces.

Turning now to FIG. 3, a preferred embodiment is illustrated showing a retaining collet 48 that includes tapered outer compression surface 54. A retaining collet 48 so tapered creates a relative size difference that results in the restriction or wedging action as the same is advanced into the compression bore 44. As illustrated, the outer compression surface 54 is tapered from a first diameter 52, defined by the shoulder of a knurled head 57, to a smaller diameter 53 spaced toward the inserted end 36. Thus, the diameter becomes decreasingly smaller in the direction along the frame axis toward the inserted end. It should be noted that to facilitate the threaded advancement of the retaining collet 48 into the compression bore 44, a knurled head 57 is provided for grasping while the connector frame 32 is rotated. Typically, the knurled head 57 is manufactured integrally with the end of the retaining collet 48.

In addition to being tapered, the preferred embodiment of the retaining collet 48 includes other features to improve its ability to advance to the second compressed condition. Namely, the outer compression surface 54 is threaded in addition to being tapered. As illustrated in FIG. 3, the threads extend from the knurled head 57 to the opposite end. In this way, the threads of the outer compression surface 54 can engage corresponding mating threads of the compression bore's threaded inner surface 46.

In addition to having threads as noted above, a portion of the retaining collet 48 has been removed to define a slot 55. As best seen in FIGS. 2, 3, and 5, the slot is oriented parallel to the frame axis 34, and is cut symmetrically through the retaining collet 48 to extend from the outer compression surface 54 to the inner gripping surface 56. The slot 55, is provided to render the retaining collet 48 more readily compressible for transmitting compression forces.

Directing attention to FIGS. 2 and 5, it can be seen that the inner gripping surface 56 of the retaining collet 48 is formed to have a plurality of circumferentially disposed grooves 59 that improve the gripping ability of the retaining collet 48 to secure the fiber optic cable. In the preferred embodiment, the grooves 59 are provide in the form of threads that compress against the fiber optic cable when the retaining collet 48 is advanced into the compression bore 44.

Turning now to FIG. 4, an alternate embodiment is illustrated where the threaded inner surface 46 of compression bore 44 is tapered in a direction toward the inserted end 36. This configuration is employed as an alternative to tapering the outer compression surface 54. It should be appreciated that any combination of the above noted threaded and/or tapered configurations could be employed in the present invention.

Returning now to FIG. 2, 3, and 5, a spring 70 disposed within a cylindrical cap 68 is illustrated as means for biasing the connector frame 32 toward the coupling block 24. In this way, the inserted end 36 is urged into the receiving portion 38 of the coupling block 24 for alignment with a corresponding opposing connector 25. It should be noted that connector 25 is configured as a connector of the type found in the prior art that would require adhesives for securing a fiber optic cable thereto.

More specifically, the spring 70 is disposed about a portion of the connector frame 32 that is recessed to form neck 77 which extends from a flange 76, disposed on the inserted end 36, to the frame connector body 86. The spring 70 comprises a first end 72 that rests against a shoulder 78 defined by flange 76. As best seen in FIG. 5, the spring 70 extends toward the connector frame body 86 and engages with a lip 80 defined by a portion of the cap 68. It should be appreciated that the neck 77 is formed by removing material from the connector frame 32 disposed between the flange 76 and the connector frame body 86. As such, the flange 76 has substantially the same diameter as the connector frame body 86. For reasons explained below, the lip 80, and accordingly the second end 74 of the spring 70 are slightly larger in diameter than the connector frame body 86.

Because, in the assembly process, cap 68 is slid into position over connector frame body 86, the lip 80 is formed with a slightly larger diameter to fit thereover. Accordingly, the second end 74 of spring 70 is also similarly sized thereby allowing the spring 70 to engage the lip 80 of cap 68. In order to maintain the cap 68 in the assembled position, as illustrated in FIG. 5, a c clip 82 is fitted into a groove 84 just behind the cap 68 to prevent the cap 68 from sliding back along the connector frame body 86.

Returning again now to FIG. 1, a connector 20 is illustrated biased against the coupling block 24. In so biasing the connector 20, the cylindrical cap 68 is moved to a locked position in a way typical of many prior art connectors. For example, the cap 68 is maintained in the locked position by engaging a locking slot 88, disposed thereon, with a locking lug 90 disposed on the receiving portion 38 of the coupling block 24. Thus the cap 68 is rotatable from a first unlocked position free of the coupling block 24 as illustrated in FIG. 5, to a second looked position to maintain the connector 20 in the received position when the connector 20 is received by the coupling block 24 as illustrated in FIGS. 1 and 2. Further, the connector frame 32 is prevented from rotating during the locking process by a guide lug 92, disposed on flange 76, that is received by guide slot 94, which is disposed on the receiving portion 38 of the coupling block 24.

It should be appreciated that the preferred embodiment connector 20 is designed to operate with "prior art" industry standard coupling devices including a coupling block 24 as illustrated. Accordingly, the preferred embodiment connector 20 shares many of the same elements of a prior art connector 25. For example, corresponding parts of a prior art connector might include, as illustrated in FIG. 3 cap 100 with locking slot 102; spring 104 disposed over frame body 106 having a flange 108; the cap 100 being maintained in position by a c clip 110 fit into groove 112.

Because proper positioning of the optical fiber core 26 within the coupling block is important, means disposed on the connector frame 32 at the inserted end 36 for so positioning the optical fiber core 26 is provided in the form of a cylindrical ceramic tip 58 having a bore 60 extending therethrough in coaxial alignment, i.e., aligned with the frame axis 34. As seen in FIG. 5, the ceramic tip 58 is secured to the connector frame 32 in a cylindrical socket 64. The optical fiber core 26 extends through a passage 62, through bore 60 flush with the end 65 of the ceramic tip 58. It should be noted that the ceramic tip 58 could be made from other materials including plastic and stainless steel.

To secure the ceramic tip 58 within the socket 64, a die tool is employed to apply pressure about the flange 76 with the ceramic tip 58 positioned is socket 64. The die slightly deforms the flange 76 to press against the ceramic tip. In this way the ceramic tip 58 is frictionally held in place.

Further, as the connector 20 is inserted into the receiving portion 28 of coupling block 24, a guide sleeve 120 disposed therein axially positions the ceramic tip 58. The guide sleeve 120 is secured within the coupling block 24 between a ferule 122 and a shoulder 124 formed on the coupling block 24.

Finally, the process or method of using the present invention is quite straight forward. Typically, the components of a connector 20 as described above are provided. A fiber optic cable 22 is positioned through the compressible retaining collet 48 for securing the fiber optic cable 22 in position relative to the connector frame 32 in coaxial alignment with the frame axis 34.

The outer jacket 28 of the fiber optic cable 22 is secured within the retaining collet 48 in close fitting relationship to the inner gripping surface 56 thereof. With the fiber optic cable 22 extending through the retaining collet 48, the exposed optical fiber core 26 is guided along the frame axis 34 from the compression end 42 of the connector frame 22, through a passage 62 disposed adjacent the compression bore 44, into the ceramic tip 58 attached on the connector frame 32 at the inserted end 36 for positioning the optical fiber core 26 along the frame axis 34 into the coupling device.

The retaining collet 48 is then threadedly engaged with the connector frame 32 to compress said retaining collet 48, wherein the same is compressed by moving from a first threadedly disengaged uncompressed position for receiving a fiber optic cable 22 therein, to a second compressed position where the outer compression surface 54 threadedly engages the compression bore 44 of the connector frame 32.

Finally, the connector 32 frame is biased toward the coupling device so that the inserted end 36 of the connector frame 32 is urged into the receiving portion 38 of the coupling device.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A reusable fiber optic connector for use with coupling devices of the type having a portion thereof adapted to receive the fiber optic connector, the connector being arranged for connecting and splicing fiber optic cables of the type that include a protective outer jacket, the jacket being provided to protect a coaxially disposed optical fiber core, the connector comprising:

a connector frame disposed about a longitudinal frame axis, the connector frame having an inserted end adapted for insertion into the receiving portion of the coupling device, and an opposing compression end spaced along the frame axis, the compression end defining a compression bore disposed coaxially about the frame axis, a portion of said compression bore having a radially disposed threaded inner surface;

means disposed on connector frame at the inserted end thereof for positioning the optical fiber core coaxially along the frame axis into the coupling device;

a passage extending from the compression bore to the positioning means for guiding the optical fiber core from the compression end to the inserted end of the connector frame;

means for biasing the connector frame toward the coupling device so that the inserted end of the connector frame is urged into the receiving portion of the coupling device;

a compressible retaining collet for securing the fiber optic cable in position relative to the connector frame in coaxial alignment with the frame axis, the retaining collet having a radially disposed inner gripping surface, and a radially disposed outer compression surface, said inner gripping surface defining a coaxial gripping bore sized to receive the outer jacket of the fiber optic cable in close fitting relationship;

said retaining collet being compressible between a first uncompressed condition where the retaining collet is threadedly disengaged from the connector frame for receiving a fiber optic cable through the gripping bore, to a second compressed condition where the compression surface of said retaining collet threadedly engages the threaded inner surface of the compression bore of the connector frame, and wherein as the retaining collet threadedly engages the threaded inner surface of the compression bore, advancing the retaining collet therein to the second compressed condition, portions of the inner gripping surface are urged against the outer jacket of the fiber optic cable.

2. A connector as recited in claim 1 wherein a portion of the retaining collet is removed to define a slot oriented parallel to the frame axis.

3. A connector as recited in claim 2 wherein the retaining collet further comprises threads disposed on a portion of the outer compression surface, and a plurality of grooves radially disposed on the inner gripping surface for gripping the outer jacket of a fiber optic cable.

4. A connector as recited in claim 3 wherein the threaded portion of the outer compression surface of the retaining collet is tapered, the threaded portion thereof sloping radially inward toward the frame axis from a first diameter to a decreasingly smaller diameter in the direction along the frame axis toward the inserted end, wherein as the retaining collet threadedly engages the threaded inner surface of the compression bore, the retaining collet advances therein to the second compressed condition where the outer compression surface thereof is wedged within the compression bore.

5. A connector as recited in claim 2 wherein a portion of the outer compression surface of the retaining collet is tapered, the tapered portion thereof sloping radially inward toward the frame axis from a first diameter to a decreasingly smaller diameter in a direction along the frame axis toward the inserted end.

6. A connector as recited in claim 1 wherein a portion of the outer compression surface of the retaining collet is tapered, the tapered portion thereof sloping radially inward toward the frame axis from a first diameter to a decreasingly smaller diameter in a direction along the frame axis toward the inserted end.

7. A connector as recited in claim 6 wherein a portion of the compression bore of the connector frame is tapered, the tapered portion thereof sloping radially inward toward the frame axis from a first diameter to a decreasingly smaller diameter in a direction along the frame axis toward the inserted end.

8. A connector as recited in claim 1 wherein the threaded portion of the compression bore of the connector frame is tapered, the tapered portion thereof sloping radially inward toward the frame axis from a first diameter to a decreasingly smaller diameter in a direction along the frame axis toward the inserted end.

9. A connector as recited in claim 1 wherein the biasing means comprises a spring coaxially disposed about the connector frame adjacent the inserted end, and a cylindrical cap disposed about the spring, the spring having a first end engaged with a portion of the connector frame, and a second end engaged with a portion of the cap, wherein when the connector is received by the coupling device, the cap is movable from a first unlocked position disconnected from the coupling device wherein the spring is substantially uncompressed, to a second locked position where the cap is connected to the coupling device, and the spring is compressed to bias the connector frame toward the coupling device.

10. A connector as recited in claim 9 wherein the second end of the spring is larger in diameter than the first end.

11. A connector as recited in claim 1 wherein said positioning means comprises a cylindrical ceramic tip fastened to the inserted end of the connector frame, the ceramic tip having a bore coaxially disposed therethrough for positioning the fiber optic core along the frame axis.

12. A method of connecting a fiber optic cable to a coupling device of the type having a portion thereof adapted to receive a fiber optic connector, the connector being arranged for connecting and splicing fiber optic cables of the type that include a protective outer jacket, the outer jacket being provided to protect a coaxially disposed optical fiber core, the method comprising the steps of:

providing a connector frame disposed about a longitudinal frame axis, the connector frame having an inserted end adapted for insertion into the receiving portion of the coupling device, and an opposing compression end spaced along the frame axis, the compression end defining a compression bore disposed coaxially about the frame axis, a portion of said compression bore having a radially disposed threaded inner surface;

positioning the fiber optic cable through a compressible retaining collet for securing the fiber optic cable in position relative to the connector frame in coaxial alignment with the frame axis, the retaining collet having a radially disposed inner gripping surface, and a radially disposed outer compression surface, said inner gripping surface defining a coaxial gripping bore sized to receive the outer jacket of the fiber optic cable in close fitting relationship, guiding the optical fiber core along the frame axis from the compression end of the connector frame, through a passage disposed adjacent the compression bore, into means disposed on the connector frame at the inserted end for positioning the optical fiber core along the frame axis into the coupling device;

threadedly engaging the retaining collet with the connector frame to compress said retaining collet, wherein the retaining collet is compressed by moving the same from a first threadedly disengaged uncompressed position for receiving a fiber optic cable therein, to a second compressed position where the outer compression surface threadedly engages the compression bore of the connector frame; and biasing the connector frame toward the coupling device so that the inserted end of the connector frame is urged into the receiving portion of the coupling device.

13. A method as recited in claim 12 further comprising the step of removing a portion of the retaining collet to define a slot oriented parallel to the frame axis.

14. A method as recited in claim 13 further comprising the step of forming threads on a portion of the outer compression surface of the retaining collet, the threads being disposed to engage the threaded inner surface of the compression bore.

15. A method as recited in claim 12 further comprising the step of forming threads on a portion of the outer compression surface of the retaining collet, the threads being disposed to engage the threaded inner surface of the compression bore.

16. A method as recited in claim 15 further comprising the step of tapering a portion of the outer compression surface of the retaining collet, the tapered portion thereof sloping radially inward toward the frame axis from a first diameter to a decreasingly smaller diameter in a direction along the frame axis toward the inserted end.

17. A method as recited in claim 12 further comprising the step of tapering a portion of the outer compression surface of the retaining collet, the tapered portion thereof sloping radially inward toward the frame axis from a first diameter to a decreasingly smaller diameter in a direction along the frame axis toward the inserted end.

18. A reusable fiber optic connector for use with coupling devices of the type having a portion thereof adapted to receive the fiber optic connector, the connector being arranged for connecting and splicing fiber optic cables of the type that include a protective outer jacket, the jacket being provided to protect a coaxially disposed optical fiber core, the connector comprising:

a connector frame disposed about a longitudinal frame axis, the connector frame having an inserted end adapted for insertion into the receiving portion of the coupling device, and an opposing compression end spaced along the frame axis, the compression end defining a compression bore disposed coaxially about the frame axis;

means disposed on the connector frame, at the inserted end for positioning the optical fiber core coaxially along the frame axis into the coupling device;

a passage extending from the compression bore to the positioning means for guiding the optical fiber core from the compression end to the inserted end;

a compressible retaining collet for securing the fiber optic cable in position relative to the connector frame in coaxial alignment with the frame axis, the retaining collet having a radially disposed inner gripping surface, and a radially disposed outer compression surface, said inner gripping surface defining a coaxial gripping bore sized to receive the outer jacket of the fiber optic cable in close fitting relationship;

said retaining collet being compressible between a first uncompressed condition where the retaining collet is disengaged from the connector frame for receiving a fiber optic cable through the gripping bore, to a second compressed condition where the outer compression surface of said retaining collet engages the compression bore of the connector frame, wherein as the retaining collet is advanced to the second compressed condition, portions of the inner gripping surface are urged against the outer jacket of the fiber optic cable;

biasing means comprising a spring coaxially disposed about the connector frame adjacent the inserted end, and a cylindrical cap disposed about the spring, the spring having a first end engaged with a portion of the connector frame, and a second end engaged with a portion of the cap, wherein when the connector is received by the coupling device, the cap is movable from a first unlocked position disconnected from the coupling device wherein the spring is substantially uncompressed, to a second locked position where the cap is connected to the coupling device, and the spring is compressed to bias the connector frame toward the coupling device; and wherein to facilitate the engagement of the second end of the spring with a portion of the cap, the second end of the spring is larger in diameter than the first end.

19. A connector as recited in claim 18 wherein a portion of the outer compression surface of the retaining collet is threaded for threaded engagement between the retaining collet and the connector frame.

20. A connector as recited in claim 19 wherein the threaded portion of the outer compression surface of the retaining collet is tapered, the threaded portion thereof sloping radially inward toward the frame axis from a first diameter to a decreasingly smaller diameter in a direction along the frame axis toward the inserted end.

* * * * *